United States Patent
Zhang et al.

(10) Patent No.: US 11,773,567 B2
(45) Date of Patent: Oct. 3, 2023

(54) ENGINEERING MACHINERY EQUIPMENT, AND METHOD, SYSTEM, AND STORAGE MEDIUM FOR SAFETY CONTROL THEREOF

(71) Applicant: Baidu USA LLC, Sunnyvale, CA (US)

(72) Inventors: Liangjun Zhang, Sunnyvale, CA (US); Liyang Wang, Sunnyvale, CA (US); Jinxin Zhao, Sunnyvale, CA (US)

(73) Assignee: Baidu USA LLC, Sunnyvale, CA (US)

( * ) Notice: Subject to any disclaimer, the term of this patent is extended or adjusted under 35 U.S.C. 154(b) by 424 days.

(21) Appl. No.: 16/935,502

(22) Filed: Jul. 22, 2020

(65) Prior Publication Data

US 2022/0025612 A1    Jan. 27, 2022

(51) Int. Cl.
*E02F 9/20* (2006.01)
*G06T 7/73* (2017.01)
*G06V 20/58* (2022.01)
*E02F 3/43* (2006.01)

(52) U.S. Cl.
CPC ............ *E02F 9/2033* (2013.01); *E02F 3/435* (2013.01); *G06T 7/74* (2017.01); *G06V 20/58* (2022.01); *G06T 2207/10016* (2013.01); *G06T 2207/10028* (2013.01); *G06T 2207/30261* (2013.01)

(58) Field of Classification Search
CPC ......... E02F 9/2033; E02F 9/205; E02F 9/264; G06T 7/74; G06T 2207/10016; G06T 2207/10028; G06T 2207/30261; G06V 20/58
See application file for complete search history.

(56) References Cited

U.S. PATENT DOCUMENTS

| | | | |
|---|---|---|---|
| 2007/0103107 A1* | 5/2007 | Hayashi | B60L 3/0038 318/466 |
| 2009/0043462 A1 | 2/2009 | Stratton et al. | |
| 2013/0222573 A1 | 8/2013 | Onuma et al. | |
| | | (Continued) | |

FOREIGN PATENT DOCUMENTS

| | | |
|---|---|---|
| CN | 103180522 A | 6/2013 |
| CN | 109972674 A | 7/2019 |
| | (Continued) | |

OTHER PUBLICATIONS

Chinese Office Action dated Mar. 18, 2022 in Chinese Patent Application No. 202110274802.1.

*Primary Examiner* — Ig T An
(74) *Attorney, Agent, or Firm* — Knobbe, Martens, Olson & Bear, LLP (57) ABSTRACT

The present disclosure discloses an engineering machinery equipment, and a method, system, and storage medium for safety control thereof, and relates to the field of artificial intelligence, automatic control, and engineering machinery technologies. A method can include: acquiring spatial sensing data of a work area; performing obstacle detection based on the spatial sensing data to determine a position of an obstacle within the work area; determining a safe working range of a mechanical structural component of the engineering machinery equipment based on the position of the obstacle within the work area; and controlling a working range of the mechanical structural component of the engineering machinery equipment based on the safe working range.

14 Claims, 6 Drawing Sheets

(56) References Cited

U.S. PATENT DOCUMENTS

| | | | |
|---|---|---|---|
| 2018/0179892 A1 | 6/2018 | Moberg et al. | |
| 2020/0291614 A1* | 9/2020 | Kiyota | E02F 9/261 |
| 2020/0407948 A1* | 12/2020 | Seki | G06V 20/58 |
| 2021/0295460 A1* | 9/2021 | Tamazato | G06Q 50/265 |
| 2022/0002978 A1* | 1/2022 | Kurosawa | E02F 9/261 |

FOREIGN PATENT DOCUMENTS

| | | | |
|---|---|---|---|
| CN | 209519246 U | | 10/2019 |
| JP | 2014198630 A | * | 10/2014 |

* cited by examiner

ENGINEERING MACHINERY EQUIPMENT, AND METHOD, SYSTEM, AND STORAGE MEDIUM FOR SAFETY CONTROL THEREOF

TECHNICAL FIELD

The present disclosure relates to the field of computer technologies, specifically relates to artificial intelligence, automatic control and engineering machinery technologies, and particularly relates to an engineering machinery equipment, and a method, system, and storage medium for safety control thereof.

BACKGROUND

The intelligentization of an engineering machinery equipment can improve the engineering work efficiency, save the manpower costs, and reduce the risks of personnel being exposed to a harmful environment.

During intelligentized running of the engineering machinery equipment, it is extremely necessary to provide related safety measures. At present, intelligentized technologies of the engineering machinery equipment have not yet been mature, and the related safety measures need to be improved.

SUMMARY

The present disclosure provides an engineering machinery equipment, and a method, system, and storage medium for safety control thereof.

According to a first aspect of the present disclosure, a method for safety control of an engineering machinery equipment is provided, including: acquiring spatial sensing data of a work area; performing obstacle detection based on the spatial sensing data to determine a position of an obstacle within the work area; determining a safe working range of a mechanical structural component of the engineering machinery equipment based on the position of the obstacle within the work area; and controlling a working range of the mechanical structural component of the engineering machinery equipment based on the safe working range.

According to a second aspect of the present disclosure, a system for safety control of an engineering machinery equipment is provided, including: at least one processor, and a memory communicatively connected to the at least one processor; where the memory stores instructions that can be executed by the at least one processor, and the instructions are executed by the at least one processor, such that the at least one processor executes: acquiring spatial sensing data of a work area; performing obstacle detection based on the spatial sensing data to determine a position of an obstacle within the work area; determining a safe working range of a mechanical structural component of the engineering machinery equipment based on the position of the obstacle within the work area; and controlling a working range of the mechanical structural component of the engineering machinery equipment based on the safe working range.

According to a third aspect of the present disclosure, an engineering machinery equipment is provided, including: a mechanical structural component and a safety control system; where the safety control system includes: at least one processor; and a memory communicatively connected to the at least one processor; where the memory stores instructions that can be executed by the at least one processor, and the instructions are executed by the at least one processor, such that the at least one processor executes: acquiring spatial sensing data of a work area; performing obstacle detection based on the spatial sensing data to determine a position of an obstacle within the work area; determining a safe working range of a mechanical structural component of the engineering machinery equipment based on the position of the obstacle within the work area; and controlling a working range of the mechanical structural component of the engineering machinery equipment based on the safe working range.

According to a fourth aspect of the present disclosure, a non-transient computer-readable storage medium storing computer instructions is provided, where the computer instructions are used for causing a computer to execute: acquiring spatial sensing data of a work area; performing obstacle detection based on the spatial sensing data to determine a position of an obstacle within the work area; determining a safe working range of a mechanical structural component of the engineering machinery equipment based on the position of the obstacle within the work area; and controlling a working range of the mechanical structural component of the engineering machinery equipment based on the safe working range.

The technology according to the present disclosure achieves effective safety control of the engineering machinery equipment.

It should be understood that contents described in the SUMMARY are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

The accompanying drawings are used for better understanding of the present solution, and do not impose a limitation on the present disclosure. In the figures.

DETAILED DESCRIPTION OF EMBODIMENTS

Example embodiments of the present disclosure are described below with reference to the accompanying drawings, including various details of the embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functions and structures are omitted in the following description.

The method for safety control of an engineering machinery equipment provided by the present disclosure may be applied to a data processing module installed on the engineering machinery equipment, or may be applied to a remote server terminal, which remotely controls the engineering machinery equipment through a communication connection established with the engineering machinery equipment.

Here, the engineering machinery equipment is a heavy or light machinery equipment used in engineering practice, and may include, but is not limited to: mechanical equipment used in earthwork construction engineering, pavement construction and maintenance, mobile crane loading and unloading operations, and various construction engineering, such as an excavator, a bulldozer, a crane, a road roller, a pile driver, and a concrete mixer.

Figure 1:
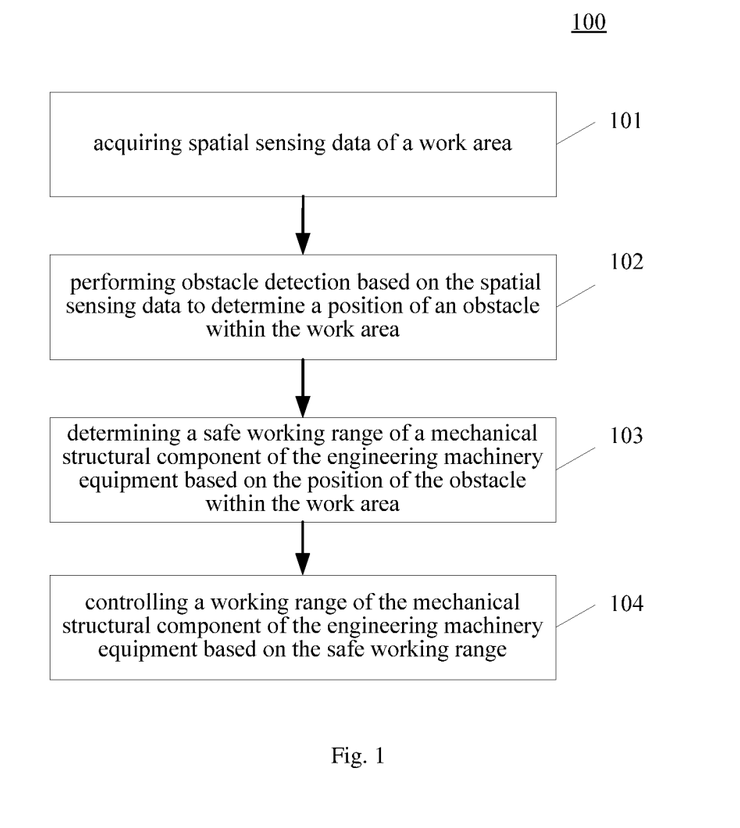
FIG. 1 is a schematic flowchart of a method for safety control of an engineering machinery equipment according to an embodiment of the present disclosure.

Referring to FIG. 1, a schematic flowchart of a method for safety control of an engineering machinery equipment according to an embodiment of the present disclosure is shown. As shown in FIG. 1, a process 100 of the method for safety control of an engineering machinery equipment of the present embodiment includes the following steps:

Step 101: acquiring spatial sensing data of a work area.

In the present embodiment, an executing body of the method for safety control of an engineering machinery equipment can acquire the spatial sensing data of the work area of the engineering machinery equipment by various approaches. The spatial sensing data is sensing data obtained by a sensor through collecting two-dimensional and/or three-dimensional information of a space, and may include at least one of the following items: two-dimensional image or two-dimensional video data collected by a two-dimensional image sensor, three-dimensional image or three-dimensional video data collected by a depth image sensor, or three-dimensional point cloud data collected by a lidar.

The executing body may obtain the spatial sensing data through a connection established with a spatial sensor for detecting spatial information within the work area, or obtain the spatial sensing data by sending a data read request to a temporary or permanent storage medium of the spatial sensor for detecting the spatial information within the work area.

Here, the spatial sensor for detecting the spatial information within the work area may be provided at a fixed position within the work area, or may be provided on the engineering machinery equipment. It should be noted that a detection area of a single spatial sensor is limited. In order to acquire spatial sensing data that can cover the entire work area, a plurality of spatial sensors distributed at different positions may be provided.

Figure 2:
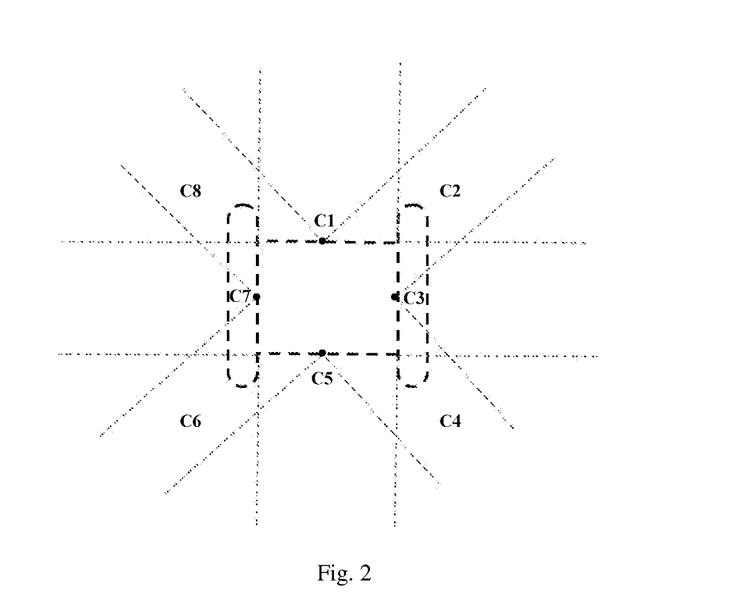
FIG. 2 is a schematic diagram of a sensing range of a spatial sensor of the engineering machinery equipment within a work area.

Referring to FIG. 2, a schematic diagram of a sensing range of a spatial sensor of the engineering machinery equipment within a work area is shown, and specifically a schematic top view of positions of the engineering machinery equipment and the spatial sensor is shown. As shown in FIG. 2, taking cameras as an example, one camera is provided on each of four sides of the engineering machinery equipment, namely a camera C1, a camera C3, a camera C5, and a camera C7. For a work area that cannot be covered by imaging ranges of the camera C1, the camera C3, the camera C5, and the camera C7, spatial information is detected by a camera C2, a camera C4, a camera C6, and a camera C8 provided in the work area, respectively. The camera here may be a color camera, an infrared camera, a depth camera, or the like.

Step 102: performing obstacle detection based on the spatial sensing data to determine a position of an obstacle within the work area.

Obstacle detection may be performed using an obstacle detection and recognition algorithm based on the spatial sensing data, for example, a detection algorithm based on obstacle template matching, an obstacle detection algorithm based on feature point matching, or an obstacle detection algorithm based on a neural network model.

The spatial sensing data can be first preprocessed to extract features of the spatial sensing data after eliminating interference data, and then identify a position and a type of the obstacle based on the extracted features.

When the spatial sensing data is two-dimensional image data or two-dimensional video data, the image data or video data may be processed using a trained obstacle detection model to extract position information of the obstacle in an image or a video, e.g., position coordinates of a bounding box of the obstacle. Alternatively, in order to speed up obstacle detection, a common obstacle placing template may be constructed based on common obstacles, including people, vehicles, and the like, in a working scenario of the engineering machinery equipment, and a position detection result of the obstacle in the two-dimensional image or the two-dimensional video may be obtained by feature extraction or template matching of the spatial sensing data using a sliding window. Then, the position of the obstacle in the two-dimensional image can be converted into a three-dimensional space based on internal and external parameters of the image sensor that collects the two-dimensional image data or the two-dimensional video data, to obtain a spatial position of the obstacle within the work area.

When the spatial sensing data is the three-dimensional point cloud data, point cloud segmentation can be performed for the three-dimensional point cloud data, and feature extraction on segmented point cloud blocks can be performed. Based on extracted features of the point cloud blocks, the obstacle can be identified, and a position of a spatial boundary of the obstacle can be determined.

Step 103: determining a safe working range of a mechanical structural component of the engineering machinery equipment based on the position of the obstacle within the work area.

The engineering machinery equipment generally consists of at least one mechanical structural component. For example, the excavator includes mechanical structural components, such as a chassis (including a crawler belt, or the like), a rotatable vehicle body, a movable arm (or referred as a big arm), a bucket arm, and a bucket.

In the present embodiment, a position and a range of motion of each mechanical structure can be determined based on the position of the obstacle, position parameters of the engineering machinery equipment (e.g., position coordinates of a center point of the rotatable vehicle body), and design parameters of each mechanical structure (e.g., a length of the movable arm, a position of a connection point of the movable arm and the rotatable vehicle body, a length of the bucket arm, and a size of the bucket). A safe working range of the mechanical structure can be determined based on the position and the range of motion of the mechanical structure, and the position of the obstacle.

Specifically, a sub-area where the obstacle is within the work area may be set as an unsafe area, and other areas within the work area except for the unsafe area may be used as safe areas. Then, whether the position and a largest range of motion of the mechanical structural component of the engineering machinery equipment intersects with the unsafe area are determined. If the position and the largest range of motion of the mechanical structural component intersects with the unsafe area, then the safe working range of the mechanical structural component is set as the part within the largest range of motion except for the incomplete area. In addition, a smallest range of motion of the mechanical structural component may also be determined. When a distance between the position of the obstacle is detected to be very close to the smallest range of motion of the mechanical structural component of the engineering machinery equipment, the safe working range of the mechanical structural component of the engineering machinery equipment may be set as "null" or "0."

It should be noted that the safe working range of the mechanical structural component of the engineering machinery equipment may also be an overall safe working range determined based on an overall structure of the engineering machinery equipment. Different mechanical structural components of a given engineering machinery equipment can "share" a given safe working range. When each mechanical structural component works within the safe working range, the engineering machinery equipment is in a safe working state. If a position of any mechanical structural component of the engineering machinery equipment exceeds the safe working range, then the engineering machinery equipment is determined to be in an unsafe working state.

Alternatively, for different mechanical structural components of the given engineering machinery equipment, due to differences in pose information (e.g., position, direction of motion, speed of motion), the corresponding safe working range may be different. That is, the safe working range of different mechanical structural components of the given engineering machinery equipment may be different.

Step 104: controlling a working range of the mechanical structural component of the engineering machinery equipment based on the safe working range.

When the mechanical structural component of the engineering machinery equipment exceeds its safe working range, the engineering machinery equipment can be controlled to stop working. When the mechanical structural component of the engineering machinery equipment does not exceed its safe working range, the mechanical structural component of the engineering machinery equipment can be controlled to work within the corresponding safe working range based on a working task. Specifically, parameters for controlling a range of motion of the mechanical structural component can be controlled and optimized using MPC (Model Predictive Control) technologies with the safe working range of each mechanical structural component as a limiting condition.

Alternatively, areas that are controlled in different control modes may also be defined based on the above safe working range. For example, the above safe working range is defined as an area in a "normal" control mode, and an area between the above safe working range and the engineering machinery equipment, with a distance from the engineering machinery equipment exceeds a certain distance threshold (e.g., 5 meters) is set as an area in a control mode of "maneuvering obstacle avoidance". An area with a distance from the engineering machinery equipment not exceeding a certain distance threshold is set as an area in a control mode of "stopping working".

Figure 3:
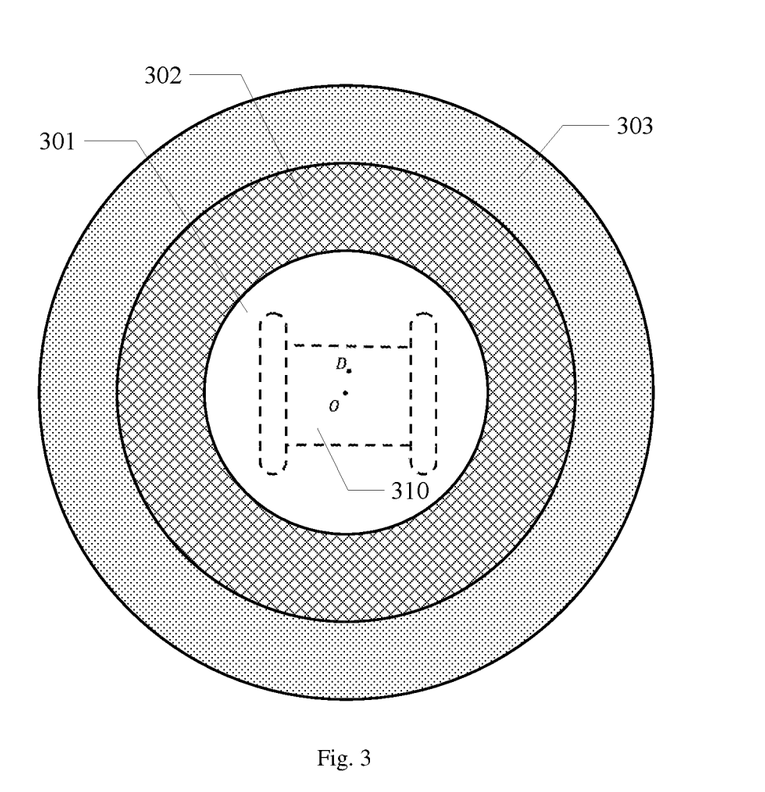
FIG. 3 is a schematic diagram of a working range division of a mechanical structural component.

Referring to FIG. 3, a schematic diagram of a control mode of a working range of a mechanical structure is shown. A center point of an engineering machinery equipment 310 is O, and D is a connection position of a movable arm and a vehicle body. An area 301 is close to the engineering machinery equipment 310, and is an area controlled in a control mode of "stopping working". When an obstacle appears in the area 301, a control command to stop working can be sent to the engineering machinery equipment 310. A distance between an area 302 and the engineering machinery equipment 310 is greater than a distance between the area 301 and the engineering machinery equipment 310. The area 302 is an area controlled in a control mode of "maneuvering obstacle avoidance." When the obstacle appears in the area 302, a mechanical structural component of the engineering machinery equipment 310 can be controlled, based on a position of the obstacle, to avoid the position of the obstacle. An area 303 belongs to a safe working range of the mechanical structural component of the engineering machinery equipment. When the obstacle appears in the area 303, the engineering machinery equipment 310 can be controlled to normally work.

As can be seen from FIG. 3, the method can flexibly control the engineering machinery equipment based on the safe working range of the mechanical structural component of the engineering machinery equipment.

It should be noted that for different mechanical structural components of a given engineering machinery equipment, when there is a difference in their safe working range, different control modes may be set pertinently, thereby further improving the degree of detail of the method for safety control.

The method for safety control of an engineering machinery equipment of the above embodiments of the present disclosure can, by actively acquiring spatial sensing data of a work area and performing obstacle detection, automatically define safe working ranges flexibly for different working sites and working environments, and control corresponding working ranges, thereby achieving automatic safety control of the engineering machinery equipment.

The above method for safety control of an engineering machinery equipment may include the following steps:

controlling the engineering machinery equipment to stop working, in response to determining that a relative position of the obstacle within the work area and the mechanical structural component of the engineering machinery equipment does not meet a preset safe working condition. That is, when the distance between the obstacle within the work area and the mechanical structure component of the engineering machinery equipment is less than a certain distance threshold, or the position of the obstacle falls within a smallest range of motion of the mechanical structural component of the engineering machinery equipment, a control signal of stopping working can be sent. For example, when the obstacle falls into the area 301 shown in FIG. 3, it is necessary to control the engineering machinery equipment to stop working, to ensure the safety of personnel and equipment within the work area.

Alternatively, the spatial sensing data acquired in the above step 101 may include image data and point cloud data. Specifically, the image data and the point cloud data can be acquired through an image sensor and a multi-beam lidar. In this case, in the above step 102, the obstacle detection may be performed by: first performing obstacle recognition based on image data of the work area, and then determining the position of the obstacle identified from the image data based on point cloud data of the work area. Specifically, the image data of the work area may be inputted into a pre-trained obstacle detection model to obtain an image-based obstacle recognition result. Based on the image-based obstacle recognition result, and comparing with the point cloud data, corresponding point cloud of the obstacle can be found from the point cloud data, and three-dimensional position coordinates of the obstacle can be determined based on the point cloud data.

Image-based obstacle detection has a high precision and a fast speed, and point cloud can provide accurate three-dimensional position information. Therefore, the above method for detecting the position of the obstacle with reference to the image and point cloud data can quickly and accurately position the obstacle in the work area.

Alternatively, the safe working range of the mechanical structural component of the engineering machinery equipment determined in the above step 103 includes a safe inclination angle range of the mechanical structural component of the engineering machinery equipment. There is a certain inclination angle between the mechanical structural component of the engineering machinery equipment in a working state and a world coordinate system. Further, an inclination angle of the mechanical structural component of the engineering machinery equipment can vary with the control signal. For example, when an excavator excavates a material pile at a remote distance, an inclination angle of the movable arm with respect to the horizontal ground is small; while when the excavator excavates a material pile at a close distance, the movable arm needs to be controlled to increase the inclination angle with respect to the horizontal ground.

An executing body of the method for safety control of an engineering machinery equipment can further determine, based on design parameters of each mechanical structural component, a relationship between a position of the mechanical structural component and a corresponding inclination angle, and further determine the safe inclination angle range of the mechanical structural component based on the corresponding relationship between the position of the mechanical structural component and the inclination angle, and the position of the obstacle. Here, the position of the mechanical structural component can be characterized by position coordinates of at least one of a center point, an initiating terminal, or an end terminal of the mechanical structural component.

Further, a safe range of three-dimensional position coordinates of the mechanical structural component can be determined based on the position of the obstacle within the work area, and then the safe inclination angle range corresponding to the safe range of the three-dimensional position coordinates can be determined based on a kinematic model of the engineering machinery equipment.

Figure 4:
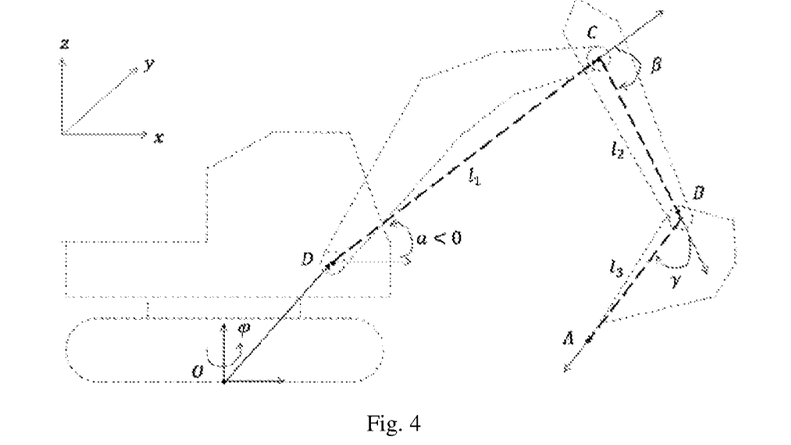
FIG. 4 is a schematic diagram of a kinematic model of the engineering machinery equipment.

FIG. 4 shows a schematic diagram of a kinematic model of the engineering machinery equipment taking an excavator as an example. As shown in FIG. 4, when a vector from a gyration center O of the excavator to a connection point D of a movable arm and a rotatable vehicle body of the excavator, a length $l_1$ of the movable arm, a length $l_2$ of a bucket arm, and a length $l_3$ of a bucket are known, a rotation angle $\varphi$ of the excavator, an inclination angle $\alpha$ of the movable arm, an inclination angle $\beta$ of the bucket arm, and an inclination angle $\gamma$ of the bucket can be measured using inclination angle sensors installed on the rotatable vehicle body, the movable arm, the bucket arm, and the bucket. Then, three-dimensional coordinates of the connection point D of the movable arm and the rotatable vehicle body of the excavator, a connection point C of the movable arm and the bucket arm, a connection point B of the bucket arm and the bucket, and an end terminal point A of the bucket can be uniquely determined in a coordinate system (O is the origin, and x, y, and Z are coordinate axes) shown in the figure, based on a geometrical relationship. Conversely, given the three-dimensional coordinates of the end terminal point A of the bucket and the inclination angle $\gamma$ of the bucket, the three angles $\varphi$, $\alpha$, and $\beta$ can also be uniquely determined. A model describing a relationship between the coordinates of the above points and the inclination angles of the excavator is a kinematic model of the excavator.

First, the safe range of the three-dimensional position coordinates of the mechanical structural component of the engineering machinery equipment can be determined based on the position of the obstacle, and then the safe range of the three-dimensional position coordinates can be converted into a corresponding safe range of inclination angle, i.e., a safe inclination angle range, using the above kinematic model.

When a working range of the mechanical structural component is controlled based on the safe inclination angle range, a safe range of control parameters transmitted from a controller of the mechanical structural component to the mechanical structural component can be computed based on the safe inclination angle range. Appropriate control parameters are transmitted through the controller to ensure that the mechanical structural component works within the safe inclination angle range.

The engineering machinery equipment may be equipped with an angle sensor for detecting an inclination angle of the mechanical structural component. In practice, a sensed inclination angle may also be implemented with reference to the angle sensor, and safely control of the inclination angle of the mechanical structural component may be performed through the controller.

The above method determines the safe inclination angle range of the mechanical structural component by constructing the kinematic model of the engineering machinery equipment, such that the controller performs accurate safety control of the mechanical structural component based on the safe inclination angle range.

Figure 5:
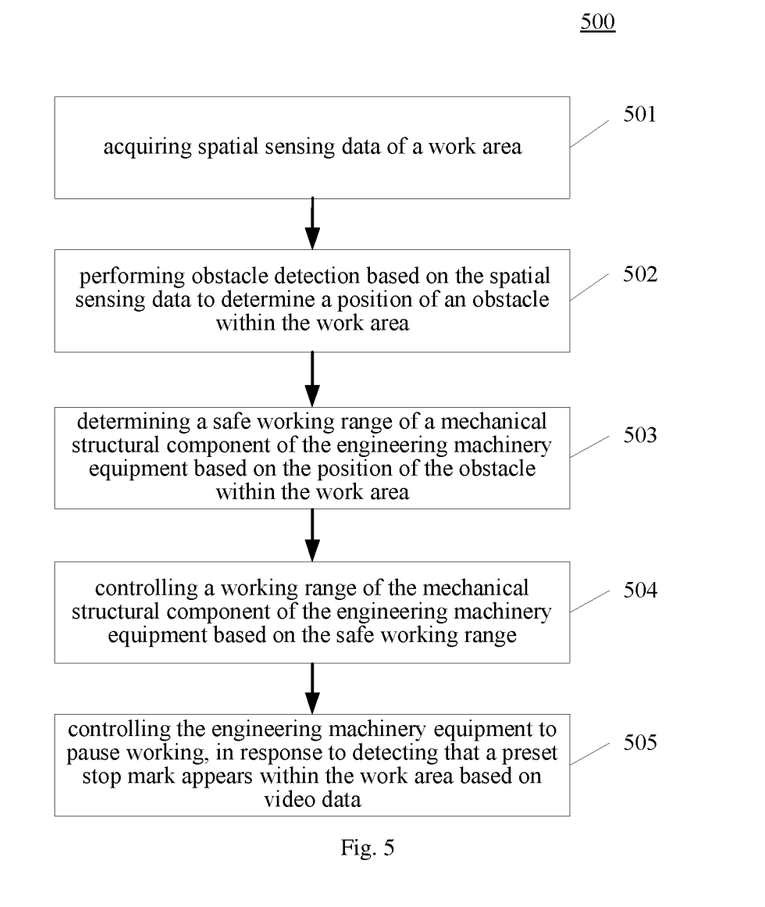
FIG. 5 is a schematic flowchart of the method for safety control of an engineering machinery equipment according to another embodiment of the present disclosure.

Referring to FIG. 5, a schematic flowchart of the method for safety control of an engineering machinery equipment according to another embodiment of the present disclosure is shown. As shown in FIG. 5, a process 500 of the method for safety control of an engineering machinery equipment of the present embodiment includes the following steps:

Step 501: acquiring spatial sensing data of a work area.

In the present embodiment, an executing body of the method for safety control of an engineering machinery equipment can obtain the spatial sensing data through a connection established with a spatial sensor for detecting spatial information within the work area, or obtain the spatial sensing data by sending a data read request to a temporary or permanent storage medium of the spatial sensor for detecting the spatial information within the work area. The spatial sensing data may include video data, and may also include three-dimensional point cloud data.

Step 502: performing obstacle detection based on the spatial sensing data to determine a position of an obstacle within the work area.

Step 503: determining a safe working range of a mechanical structural component of the engineering machinery equipment based on the position of the obstacle within the work area.

Step 504: controlling a working range of the mechanical structural component of the engineering machinery equipment based on the safe working range.

Step 502, step 503, and step 504 in the present embodiment are consistent with step 102, step 103, and step 104 in the above embodiments, respectively. The description on step 102, step 103, and step 104 in the above embodiments may be referred to for specific implementations of step 502, step 503, and step 504, respectively. The description will not be repeated here.

Step 505: controlling the engineering machinery equipment to pause working, in response to detecting that a preset stop mark appears within the work area based on video data.

In the present embodiment, when a situation that affects safe work appears within the work area, safety personnel may put up a sign board presenting the preset stop mark, or a stop mark may be presented on a preset marking plate. When the preset stop mark appearing within the work area is detected in real time based on the video data within the work area, a control quantity of 0 can be sent to the mechanical structural component of the engineering machinery equipment, such that each mechanical structural component stops.

Specifically, real-time detection can be performed for an image frame in the acquired video data, and whether the preset stop mark appears in the image frame is detected using template matching of the preset stop mark. The engineering machinery equipment is controlled to pause working, once detecting that the preset stop mark appears.

Figure 6:
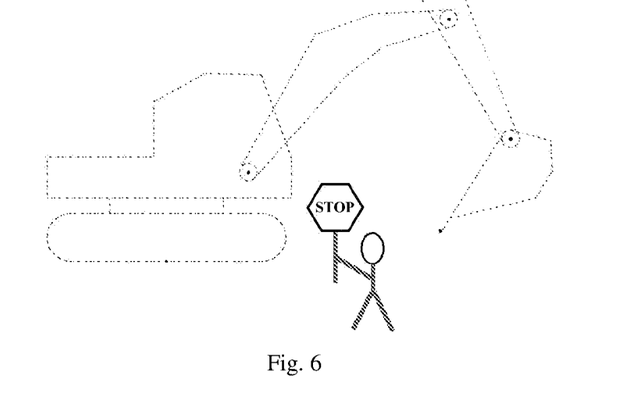
FIG. 6 is a schematic diagram of an application scenario of the method for safety control of an engineering machinery equipment shown in FIG. 5 according to an embodiment of the present disclosure.

Referring to FIG. 6, a schematic diagram of an application scenario of the method for safety control of an engineering machinery equipment shown in FIG. 5 is shown.

When an excavator is required to pause working, safety personnel can put up a sign board including a "STOP" mark. A camera in the work area continuously collects the video data in real time, performs real-time detection, and controls the excavator to pause working immediately when detecting that the "STOP" mark appears in the video data.

Therefore, the method of the present embodiment can remotely control the engineering machinery equipment to pause working by detecting the preset stop mark, thereby further improving the safety and enhancing the intelligentization degree of the method for safety control in a scenario where the engineering machinery equipment is unmanned.

Alternatively, the engineering machinery equipment is controlled to resume working, in response to detecting that the preset stop mark within the work area disappears based on the video data.

The preset stop mark within the work area can be monitored in real time based on video detection or image detection technologies. If the preset stop mark continuously appears, then the engineering machinery equipment is maintained in a state of pausing working. The mechanical structural component can be controlled to resume the operation before the pausing working and continue working, in response to detecting that the preset stop mark disappears in the video at a certain moment. Further, control parameters during the last pausing can be read when resuming working, and the engineering machinery equipment can be controlled to continue working based on the control parameters. Thus, working information of the engineering machinery equipment will not be lost, and the system does not need to be restarted when resuming working, such that the functions of pausing working and resuming working of the engineering machinery equipment can be achieved, and the risks brought by recomputing the control parameters when resuming working can be avoided.

Figure 7:
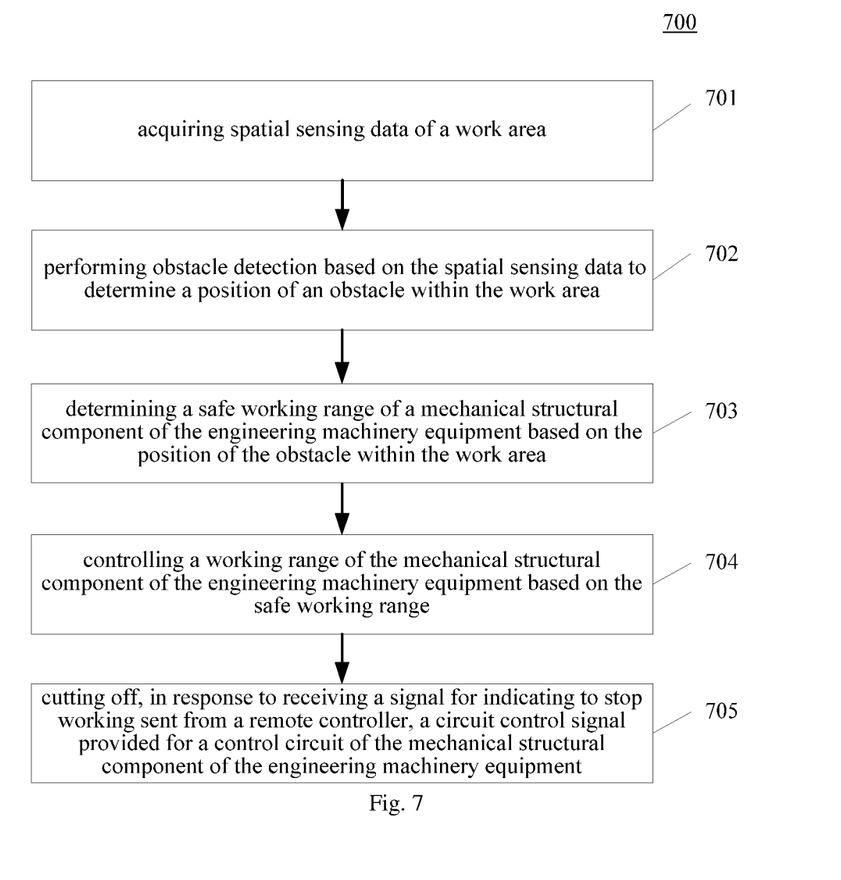
FIG. 7 is a schematic flowchart of the method for safety control of an engineering machinery equipment according to still another embodiment of the present disclosure.

Further referring to FIG. 7, a flowchart of the method for safety control of an engineering machinery equipment according to still another embodiment of the present disclosure is shown. As shown in FIG. 7, a process 700 of the method for safety control of an engineering machinery equipment of the present embodiment includes the following steps:

Step 701: acquiring spatial sensing data of a work area.

Step 702: performing obstacle detection based on the spatial sensing data to determine a position of an obstacle within the work area.

Step 703: determining a safe working range of a mechanical structural component of the engineering machinery equipment based on the position of the obstacle within the work area.

Step 704: controlling a working range of the mechanical structural component of the engineering machinery equipment based on the safe working range.

Step 705: cutting off, in response to receiving a signal for indicating to stop working sent from a remote controller, a circuit control signal provided for a control circuit of the mechanical structural component of the engineering machinery equipment.

Step 701 to step 704 are consistent with step 101 to step 104 in the above embodiments, respectively. The description of step 101 to step 104 in the above embodiments may be referred to for specific implementations of step 701 to step 704, respectively. The description will not be repeated here.

In addition to defining the safe working range based on the spatial sensing data detected by the spatial sensor, in the present embodiment, safety control of the engineering machinery equipment may also be achieved with reference to a remote controller.

Specifically, a remote controller terminal may be operated by safety personnel, and a receiver may be installed on the engineering machinery equipment. The receiver and the remote controller may be used pairwise. A communication connection is established within a specified frequency band. For example, a wireless communication protocol in a 2.4 GHz ISM band (Industrial Scientific Medical Band) may be used for data transmission. The receiver may be connected to the above executing body and a control circuit of each mechanical structural component. The remote controller terminal can code a state of a safety button provided thereon, and convert it into a pulse width modulation signal, which is transmitted through an antenna via a high-frequency circuit. The signal received by the receiver terminal through the antenna is converted into a pulse width modulation signal through a radio frequency and intermediate-frequency circuit, and state information of the safety button can be obtained by decoding the pulse width modulation signal. When the state of the safety button being "pressed down" is analyzed based on the pulse width modulation signal, it means that the remote controller has sent a signal indicating to stop working. In this case, the executing body of the method for safety control of an engineering machinery equipment cuts off the circuit control signal provided for the control circuit of the mechanical structural component of the engineering machinery equipment, such that the mechanical structural component stops working, thus achieving the remote-controlled stop function.

Therefore, the method provided in the present embodiment more reliably guarantees the safety of the engineering machinery equipment on the basis of autonomously defining the safe working range, in combination with the safety control using the remote controller.

Figure 8:
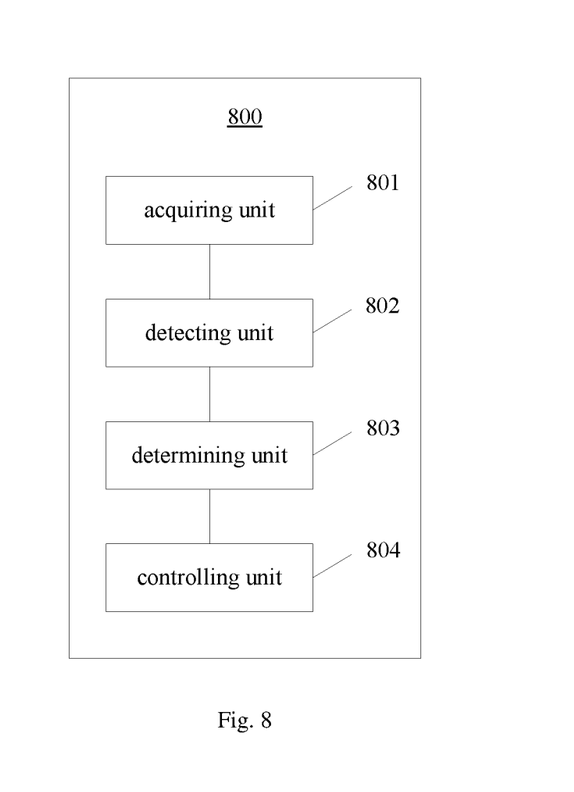
FIG. 8 is a block diagram of an apparatus for safety control of an engineering machinery equipment according to an embodiment of the present disclosure.

Referring to FIG. 8, as an implementation of the method for safety control of an engineering machinery equipment, an embodiment of the present disclosure provides an apparatus for safety control of an engineering machinery equipment. The embodiment of the apparatus corresponds to the above embodiments of the method. The apparatus may be specifically applied to various electronic devices.

As shown in FIG. 8, the apparatus 800 for safety control of an engineering machinery equipment of the present embodiment includes: an acquiring unit 801, a detecting unit 802, a determining unit 803, and a controlling unit 804. The acquiring unit 801 is configured to acquire spatial sensing data of a work area; the detecting unit 802 is configured to perform obstacle detection based on the spatial sensing data to determine a position of an obstacle within the work area; the determining unit 803 is configured to determine a safe working range of a mechanical structural component of the engineering machinery equipment based on the position of the obstacle within the work area; and the controlling unit 804 is configured to control a working range of the mechanical structural component of the engineering machinery equipment based on the safe working range.

In some embodiments, the spatial sensing data includes image data and point cloud data, and the detecting unit 802 further includes: an obstacle recognizing module configured to perform obstacle recognition based on the image data of the work area; and an obstacle position determining module configured to determine the position of the obstacle identified from the image data based on the point cloud data of the work area.

In some embodiments, the safe working range includes a safe inclination angle range.

In some embodiments, the determining unit includes: a position coordinate determining module configured to determine a safe range of three-dimensional position coordinates of the mechanical structural component based on the position of the obstacle within the work area; and a safe inclination angle range determining module configured to determine the safe inclination angle range corresponding to the safe range of the three-dimensional position coordinates based on a kinematic model of the engineering machinery equipment.

In some embodiments, the apparatus further includes: a terminating unit configured to control the engineering machinery equipment to stop working, in response to determining that a relative position of the obstacle within the work area and the mechanical structural component of the engineering machinery equipment does not meet a preset safe working condition.

In some embodiments, the spatial sensing data includes video data; and the apparatus further includes: a pausing unit configured to control the engineering machinery equipment to pause working, in response to detecting that a preset stop mark appears within the work area based on the video data.

In some embodiments, the apparatus further includes: a resuming unit configured to control the engineering machinery equipment to resume working, in response to detecting that the preset stop mark within the work area disappears based on the video data.

In some embodiments, the apparatus further includes: a cutoff unit configured to cut off, in response to receiving a signal for indicating to stop working sent from a remote controller, a circuit control signal provided for a control circuit of the mechanical structural component of the engineering machinery equipment.

The apparatus 800 corresponds to steps in the above embodiments of the method. Therefore, the operations, features, and achieved technical effects described above for the method for safety control of an engineering machinery equipment also apply to the apparatus 800 and the units included therein. The description will not be repeated here.

According to an embodiment of the present disclosure, the present disclosure further provides a system and a readable storage medium for safety control of an engineering machinery equipment.

Figure 9:
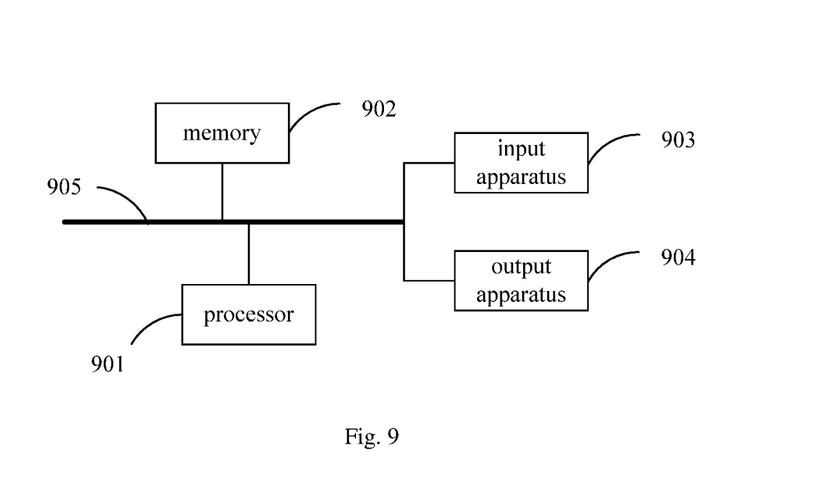
FIG. 9 is a block diagram of a system for safety control of an engineering machinery equipment according to an embodiment of the present disclosure.

As shown in FIG. 9, a block diagram of a system for safety control of an engineering machinery equipment according to an embodiment of the present disclosure is shown. The system for safety control of an engineering machinery equipment is intended to represent various forms of digital computers, such as a laptop computer, a desktop computer, a workbench, a personal digital assistant, a server, a blade server, a mainframe computer, and other suitable computers. The electronic device may also represent various forms of mobile apparatuses, such as a personal digital assistant, a cell phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 9, the system for safety control of an engineering machinery equipment includes: one or more processors 901, a memory 902, and interfaces for connecting various components, including a high-speed interface and a low-speed interface. The various components are interconnected using different buses, and may be mounted on a common motherboard or in other manners as required. The processor can process instructions for execution within the electronic device, including instructions stored in the memory or on the memory to display graphical information for a GUI on an external input/output apparatus (e.g., a display device coupled to an interface). In other embodiments, a plurality of processors and/or a plurality of buses may be used, as appropriate, along with a plurality of memories. Similarly, a plurality of electronic devices may be connected, with each device providing portions of necessary operations (e.g., as a server array, a group of blade servers, or a multi-processor system). In FIG. 9, a processor 901 is taken as an example.

The memory 902 is a non-transient computer-readable storage medium provided by the present disclosure. The memory stores instructions that can be executed by at least one processor, such that the at least one processor executes the method for safety control of an engineering machinery equipment provided by the present disclosure. The non-transient computer-readable storage medium of the present disclosure stores computer instructions. The computer instructions are used for causing a computer to execute the method for safety control of an engineering machinery equipment provided by the present disclosure.

As a non-transient computer-readable storage medium, the memory 902 may be configured to store non-transient software programs, non-transient computer-executable programs and modules, such as the program instructions/modules (e.g., the acquiring unit 801, the detecting unit 802, the determining unit 803, and the controlling unit 804 shown in FIG. 8) corresponding to the method for safety control of an engineering machinery equipment in some embodiments of the present disclosure. The processor 901 runs the non-transient software programs, the instructions, and the modules stored in the memory 902, so as to execute various function applications and data processing of a server, i.e., implementing the method for safety control of an engineering machinery equipment in the above embodiments of the method.

The memory 902 may include a program storage area and a data storage area, where the program storage area may store an operating system and an application program required by at least one function; and the data storage area may store, e.g., data created based on use of the system for safety control of an engineering machinery equipment. In addition, the memory 902 may include a high-speed random access memory, and may further include a non-transient memory, such as at least one magnetic disk storage component, a flash memory component, or other non-transient solid state storage components. In some embodiments, the memory 902 alternatively includes memories configured remotely relative to the processor 901, and these remote memories may be connected to the system for safety control of an engineering machinery equipment via a network. Examples of the above network include, but are not limited to, the Internet, an intranet, a local area network, a mobile communication network, and a combination thereof.

The system for safety control of an engineering machinery equipment may further include: an input apparatus 903 and an output apparatus 904. The processor 901, the memory 902, the input apparatus 903, and the output apparatus 904 may be connected through a bus or in other manners. A connection through a bus 905 is taken as an example in FIG. 9.

The input apparatus 903 can receive inputted number or character information, and generate a key signal input related to user settings and function control of the system for safety control of an engineering machinery equipment, e.g., an input apparatus such as a touch screen, a keypad, a mouse, a trackpad, a touchpad, an indicating arm, one or more mouse buttons, a trackball, and a joystick. The output apparatus 904 may include a display device, an auxiliary lighting apparatus (e.g., an LED), a haptic feedback apparatus (e.g., a vibration motor), and the like. The display device may include, but is not limited to, a liquid crystal display (LCD), a light emitting diode (LED) display, and a plasma display. In some embodiments, the display device may be a touch screen.

The system for safety control of an engineering machinery equipment may further include a remote control signal receiver. The remote control signal receiver is used in combination with a remote controller. When the remote control signal receiver receives a signal for indicating to stop working sent from the remote controller, the receiver sends the signal for indicating to stop working to the processor 901, and the processor cuts off a circuit control signal provided for a control circuit of the mechanical structural component of the engineering machinery equipment based on the signal for indicating to stop working.

Further, the system for safety control of an engineering machinery equipment may further include a spatial data sensor. The spatial data sensor may be one of the above input apparatuses 903. The spatial data sensor collects spatial sensing data of the work area of the engineering machinery equipment, and may further transmits the collected spatial sensing data to the processor 901 through the bus 905.

Various embodiments of the systems and technologies described herein may be implemented in a digital electronic circuit system, an integrated circuit system, an ASIC (application specific integrated circuit), computer hardware, firmware, software, and/or a combination thereof. The various embodiments may include: implementation in one or more computer programs that are executable and/or interpretable on a programmable system including at least one programmable processor, which may be a special purpose or general purpose programmable processor, and may receive data and instructions from, and transmit data and instructions to, a storage system, at least one input apparatus, and at least one output apparatus.

These computing programs (also known as programs, software, software applications, or code) include machine instructions for a programmable processor, and may be implemented in a high-level procedural and/or object-oriented programming language, and/or in an assembly/machine language. As used herein, the terms "machine-readable medium" and "computer-readable medium" refer to any computer program product, device, and/or apparatus (e.g., a magnetic disk, an optical disk, a memory, or a programmable logic device (PLD)) configured to provide machine instructions and/or data to a programmable processor, and include a machine-readable medium receiving machine instructions as machine-readable signals. The term "machine-readable signal" refers to any signal used to provide machine instructions and/or data to a programmable processor.

To provide interaction with a user, the systems and technologies described herein can be implemented on a computer that is provided with: a display apparatus (e.g., a CRT (cathode ray tube) or a LCD (liquid crystal display) monitor) for displaying information to the user; and a keyboard and a pointing apparatus (e.g., a mouse or a trackball) by which the user can provide an input to the computer. Other kinds of apparatus may also be used to provide interaction with the user. For example, the feedback provided to the user may be any form of sensory feedback (e.g., visual feedback, auditory feedback, or haptic feedback); and may receive an input from the user in any form (including an acoustic input, a voice input, or a tactile input).

The systems and technologies described herein may be implemented in a computing system that includes a back-end component (for example, as a data server), or a computing system that includes a middleware component (for example, an application server), or a computing system that includes a front-end component (for example, a user computer with a graphical user interface or a web browser through which the user can interact with an implementation of the systems and technologies described herein), or a computing system that includes any combination of such a back-end component, such a middleware component, or such a front-end component. The components of the system can be interconnected by any form or medium of digital data communication (e.g., a communication network). Examples of the communication network include: a local area network (LAN), a wide area network (WAN), and the Internet.

The computer system may include a client terminal and a server. The client terminal may be, but is not limited to, a smart phone, a tablet computer, a notebook computer, a desktop computer, a smart speaker, a smart watch, and the like. The server may be a stand-alone physical server, or may be a server cluster or a distributed system composed of a plurality of physical servers, or may be a cloud server that provides a basic cloud computing service, such as cloud computing, a cloud service, a cloud database, and cloud storage. The client terminal and the server are generally remote from each other, and usually interact through a communication network. The relationship of the client terminal and the server arises by virtue of computer programs that run on corresponding computers and have a client-server relationship with each other.

Figure 10:
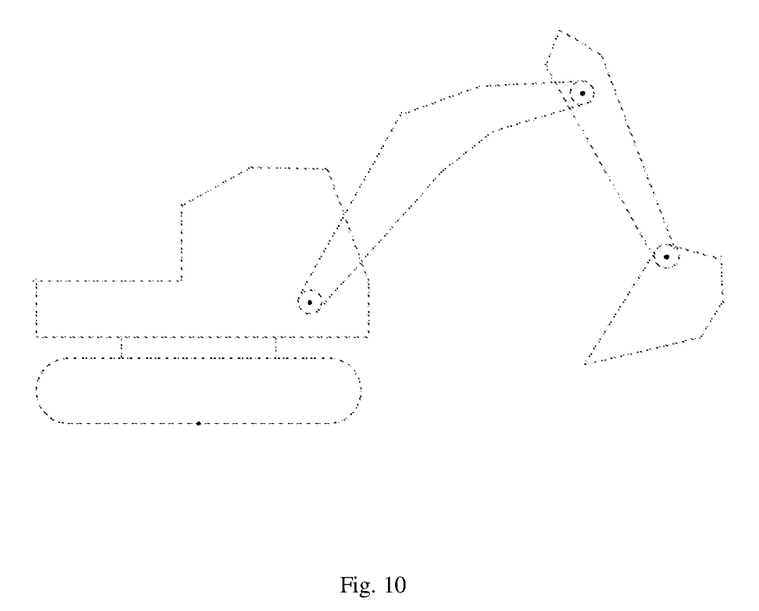
FIG. 10 is a schematic diagram of the engineering machinery equipment according to an embodiment of the present disclosure.

In addition, the embodiments of the present disclosure further provide an engineering machinery equipment. FIG. 10 shows an example of the engineering machinery equipment taking an excavator as an example. The engineering machinery equipment includes a mechanical structural component and a safety control system. The safety control system here may be the above system for safety control of an engineering machinery equipment described with reference to FIG. 9. The mechanical structural component is a mechanical component constituting the engineering machinery equipment. For example, the excavator includes: a rotatable vehicle body, a movable arm, a bucket arm, a bucket, a crawler belt, and the like. The safety control system of the engineering machinery equipment can sense a working environment of the engineering machinery equipment, and control a safe working range.

The technical solutions according to the embodiments of the present disclosure achieve autonomous definition of the safe working range and effective safety control by detecting the spatial data of the work area of the engineering machinery equipment.

It should be understood that the various forms of processes shown above can be used to reorder, add, or delete steps. For example, the steps described in the present disclosure can be executed in parallel, sequentially, or in different orders, as long as the desired results of the technical solutions disclosed in the present disclosure can be achieved. This is not limited herein.

The above specific embodiments do not constitute a limitation to the protection scope of the present disclosure. It should be understood by those skilled in the art that various modifications, combinations, sub-combinations, and substitutions may be made according to the design requirements and other factors. Any modification, equivalent replacement, improvement, and the like made within the spirit and principle of the present disclosure should be included within the protection scope of the present disclosure.

What is claimed is:

1. A method for safety control of an engineering machinery equipment, comprising:
acquiring spatial sensing data of a work area, wherein acquiring the spatial sensing data of the work area comprises:
acquiring the spatial sensing data of the work area by using a plurality of sensors comprising a first sensor, a second sensor, a third sensor, a fourth sensor, a fifth sensor, a sixth sensor, a seventh sensor, and an eighth sensor, wherein the first sensor, the third sensor, the fifth sensor and the seventh sensor are evenly disposed on four sides of the engineering machinery equipment respectively, and the second sensor, the fourth sensor, the sixth sensor and the eighth sensor are evenly disposed in a target area out of sensing ranges of the first sensor, the third sensor, the fifth sensor and the seventh sensor and other than the engineering machinery equipment, the target area being a part of the work area;
performing obstacle detection based on the spatial sensing data to determine a position of an obstacle within the work area, wherein the work area is divided into a plurality of areas by a distance to a mechanical structural component;
determining that the obstacle is within a first area of the plurality of areas, wherein a shortest distance between the first area and the mechanical structural component is greater than a first distance, and a longest distance between the first area and the mechanical structural component is smaller than a second distance;
determining a safe working range of the mechanical structural component of the engineering machinery equipment based on the position of the obstacle within the work area; and
controlling a working range of the mechanical structural component of the engineering machinery equipment based on the safe working range, wherein controlling the working range of the mechanical structural component of the engineering machinery equipment based on the safe working range comprises:
controlling the mechanical structural component of the engineering machinery equipment to operate in the first area while avoiding the position of the obstacle.

2. The method according to claim 1, wherein the spatial sensing data comprises image data and point cloud data;
the performing obstacle detection based on the spatial sensing data to determine a position of an obstacle within the work area comprises:
performing obstacle recognition based on the image data of the work area; and
determining the position of the obstacle identified from the image data based on the point cloud data of the work area.

3. The method according to claim 1, wherein the safe working range comprises a safe inclination angle range, wherein the safe inclination angle range comprises a safe range of an angle between an inclination angle of a movable arm of the mechanical structural component with respect to a horizontal ground.

4. The method according to claim 3, wherein the determining a safe working range of a mechanical structural component of the engineering machinery equipment based on the position of the obstacle within the work area comprises:
determining a safe range of three-dimensional position coordinates of the mechanical structural component based on the position of the obstacle within the work area; and
determining the safe inclination angle range corresponding to the safe range of the three-dimensional position coordinates based on a kinematic model of the engineering machinery equipment.

5. The method according to claim 1, wherein the method further comprises:
controlling the engineering machinery equipment to stop working, in response to determining that a relative position of the obstacle within the work area and the mechanical structural component of the engineering machinery equipment does not meet a preset safe working condition.

6. The method according to claim 1, wherein the spatial sensing data comprises video data; and
the method further comprises:
controlling the engineering machinery equipment to pause working, in response to detecting a stop sign within the work area based on the video data.

7. The method according to claim 6, wherein the method further comprises:

controlling the engineering machinery equipment to resume working, in response to detecting that the stop sign within the work area disappears based on the video data.

8. The method according to claim 1, wherein the method further comprises:
cutting off, in response to receiving a signal for indicating to stop working sent from a remote controller, a circuit control signal provided for a control circuit of the mechanical structural component of the engineering machinery equipment.

9. A system for safety control of an engineering machinery equipment, comprising:
at least one processor; and
a memory communicatively connected to the at least one processor; wherein
the memory stores instructions that can be executed by the at least one processor, and the instructions are executed by the at least one processor, such that the at least one processor executes:
acquiring spatial sensing data of a work area, wherein acquiring the spatial sensing data of the work area comprises:
acquiring the spatial sensing data of the work area by using a plurality of sensors comprising a first sensor, a second sensor, a third sensor, a fourth sensor, a fifth sensor, a sixth sensor, a seventh sensor, and an eighth sensor, wherein the first sensor, the third sensor, the fifth sensor and the seventh sensor are evenly disposed on four sides of the engineering machinery equipment respectively, and the second sensor, the fourth sensor, the sixth sensor and the eighth sensor are evenly disposed in a target area out of sensing ranges of the first sensor, the third sensor, the fifth sensor and the seventh sensor and other than the engineering machinery equipment, the target area being a part of the work area;
performing obstacle detection based on the spatial sensing data to determine a position of an obstacle within the work area, wherein the work area is divided into a plurality of areas by a distance to a mechanical structural component;
determining that the obstacle is within a first area of the plurality of areas, wherein a shortest distance between the first area and the mechanical structural component is greater than a first distance, and a longest distance between the first area and the mechanical structural component is smaller than a second distance;
determining a safe working range of the mechanical structural component of the engineering machinery equipment based on the position of the obstacle within the work area; and
controlling a working range of the mechanical structural component of the engineering machinery equipment based on the safe working range, wherein controlling the working range of the mechanical structural component of the engineering machinery equipment based on the safe working range comprises:
controlling the mechanical structural component of the engineering machinery equipment to operate in the first area while avoiding the position of the obstacle.

10. The system according to claim 9, wherein the system further comprises:
a remote control signal receiver; and
the remote control signal receiver is used in combination with a remote controller, such that when the remote control signal receiver receives a signal for indicating to stop working sent from the remote controller, the processor cuts off a circuit control signal provided for a control circuit of the mechanical structural component of the engineering machinery equipment.

11. The system according to claim 9, wherein the system further comprises a spatial data sensor, the spatial data sensor collecting spatial sensing data of the work area of the engineering machinery equipment.

12. An engineering machinery equipment, comprising:
a mechanical structural component and a safety control system;
wherein the safety control system comprises: at least one processor; and a memory communicatively connected to the at least one processor;
wherein the memory stores instructions that can be executed by the at least one processor, and the instructions are executed by the at least one processor, such that the at least one processor executes:
acquiring spatial sensing data of a work area, wherein acquiring the spatial sensing data of the work area comprises:
acquiring the spatial sensing data of the work area by using a plurality of sensors comprising a first sensor, a second sensor, a third sensor, a fourth sensor, a fifth sensor, a sixth sensor, a seventh sensor, and an eighth sensor, wherein the first sensor, the third sensor, the fifth sensor and the seventh sensor are evenly disposed on four sides of the engineering machinery equipment respectively, and the second sensor, the fourth sensor, the sixth sensor and the eighth sensor are evenly disposed in a target area out of sensing ranges of the first sensor, the third sensor, the fifth sensor and the seventh sensor and other than the engineering machinery equipment, the target area being a part of the work area;
performing obstacle detection based on the spatial sensing data to determine a position of an obstacle within the work area, wherein the work area is divided into a plurality of areas by a distance to a mechanical structural component;
determining that the obstacle is within a first area of the plurality of areas, wherein a shortest distance between the first area and the mechanical structural component is greater than a first distance, and a longest distance between the first area and the mechanical structural component is smaller than a second distance;
determining a safe working range of the mechanical structural component of the engineering machinery equipment based on the position of the obstacle within the work area; and
controlling a working range of the mechanical structural component of the engineering machinery equipment based on the safe working range, wherein controlling the working range of the mechanical structural component of the engineering machinery equipment based on the safe working range comprises: controlling the mechanical structural component of the engineering machinery equipment to operate in the first area while avoiding the position of the obstacle.

13. A non-transient computer-readable storage medium storing computer instructions, wherein the computer instructions are used for causing a computer to execute:
acquiring spatial sensing data of a work area, wherein acquiring the spatial sensing data of the work area comprises:
acquiring the spatial sensing data of the work area by using a plurality of sensors comprising a first sensor, a second sensor, a third sensor, a fourth sensor, a fifth sensor, a sixth sensor, a seventh sensor, and an eighth sensor, wherein the first sensor, the third sensor, the fifth sensor and the seventh sensor are evenly disposed on four sides of an engineering machinery equipment respectively, and the second sensor, the fourth sensor, the sixth sensor and the eighth sensor are evenly disposed in a target area out of sensing ranges of the first sensor, the third sensor, the fifth sensor and the seventh sensor and other than the engineering machinery equipment, the target area being a part of the work area;

performing obstacle detection based on the spatial sensing data to determine a position of an obstacle within the work area, wherein the work area is divided into a plurality of areas by a distance to a mechanical structural component;

determining that the obstacle is within a first area of the plurality of areas, wherein a shortest distance between the first area and the mechanical structural component is greater than a first distance, and a longest distance between the first area and the mechanical structural component is smaller than a second distance;

determining a safe working range of the mechanical structural component of the engineering machinery equipment based on the position of the obstacle within the work area; and controlling a working range of the mechanical structural component of the engineering machinery equipment based on the safe working range, wherein controlling the working range of the mechanical structural component of the engineering machinery equipment based on the safe working range comprises:

controlling the mechanical structural component of the engineering machinery equipment to operate in the first area while avoiding the position of the obstacle.

14. The method according to claim 1, wherein the plurality of areas comprises a second area, a longest distance between the second area and the mechanical structure component is smaller than the first distance, and the method further comprises:

determining that a second obstacle is within the second area, and in response to determining that the second obstacle is within the second area, pausing an operation of the mechanical structural component.

\* \* \* \* \*